3,661,818
METHOD FOR PREPARING AND COMPOSITIONS OF VINYLIZED AND/OR VINYLIDENIZED EPOXY RESIN ESTERS
Rolf Guldenpfennig, Bammental, Germany, assignor to Reichhold-Albert-Chemie Aktiengesellschaft, Hamburg, Germany
No Drawing. Continuation-in-part of application Ser. No. 704,994, Feb. 13, 1968. This application Apr. 12, 1971, Ser. No. 133,333
Claims priority, application Germany, Feb. 22, 1967, R 45,344
The portion of the term of the patent subsequent to Feb. 16, 1988, has been disclaimed
Int. Cl. C08g 5/20
U.S. Cl. 260—19 EP
11 Claims

ABSTRACT OF THE DISCLOSURE

Methods and compositions for water-dilutable heat-curable coatings comprising:
(I) Vinylized and/or vinylidenized compounds of partial esters containing hydroxyl groups and optionally also epoxide groups obtained by partial esterification of compounds containing epoxide groups and optionally hydroxyl groups with monocarboxylic acid mixtures having a predominant content of unsaturated aliphatic straight chain monocarboxylic acids and/or partial esters reacted with polybasic carboxylic acids in such a way that the resulting epoxide resin esters containing free carboxyl groups and free hydroxyl groups acquire the ability to be diluted with water by neutralization with ammonia or strong organic nitrogen bases in the presence of water;
(II) Ammonia or strong organic nitrogen bases;
(III) Water; and
(IV) heat-curable, water-soluble or hydrophilic low molecular weight aldehyde condensation products of:
 (a) phenolic resols;
 (b) resins which form aminoplasts; and
 (c) etherified phenolic resols.

CROSS-REFERENCES TO RELATED APPLICATIONS

Applicant incorporated by reference his copending U.S. applications Ser. No. 661,558, filed Aug. 18, 1967, entitled "Water-Dilutable Coating Compositions Containing Etherified Phenol Resols" now abandoned; Ser. No. 665,453, filed Sept. 8, 1967, entitled "Water-Dilutable Coating Compositions Containing Precondensates of Phenol Resols and Etherified Phenol Resols with Epoxy Resin Partial Esters" now abandoned; and U.S. Pat. No. 3,563,929, filed Oct. 9, 1967, entitled "Method for Producing Water-Dilutable Epoxy Ester Resins Containing Copolymers of Vinyl and/or Vinylidene Compounds."

The present application is a continuation-in-part of application Ser. No. 704,944, filed Feb. 13, 1968, now abandoned.

BACKGROUND OF THE INVENTION

The field of the invention is coating compositions containing fat, fatty oil, fatty oil acid or salts thereof.

Coating compositions and lacquer binders dissolved in organic solvents and based on epoxy resin esters optionally combined with phenolic resins and/or melamine resins, have achieved a firm place among the paint media as binders, especially for primers. The new coating compositions and lacquer binders, based on epoxy ester resins combined with phenolic resins and/or melamine resins, are made water-soluble and hence combine the advantages of the two types of binders.

The state of the prior art is set forth in Kirk-Othmer Encyclopedia of Chemical Technology, 2nd Edition, volume 1 (1963), "Alkyd Resins," pages 851–882; volume 8 (1965) "Electrophoretic Deposition," pages 23–36; and volume 8 "Epoxy Resins," pages 294–312, particularly pages 304–309 which disclose epoxy esters and their utility in protective coatings.

The vinylation of unsaturated fatty acid esters is being described in "Fette, Seifen, Anstrichm." (Fats, Soaps, Paints) volume 58 (1956) pages 528–534.

The U.S. Pat. 2,981,710 describes a resin composition which is obtained by mixing a low-molecular aldehyde condensation product, a plasticizing alkyd resin and an organic base or ammonia respectively. The described coating compositions, however, cannot be compared with the coating compositions of this invention, since they do not contain a substantial amount of vinyl monomers nor epoxy groups. Based on these facts the films of the coating compositions of the U.S. Pat. 2,981,710 do not have such good properties as the films of the compositions of this invention do in view of salt spray resistance. They also don't qualify for electrophoretic deposition methods.

The U.S. Pat. 3,118,848 describes a water-soluble coating composition consisting essentially of a mixture containing among others water-soluble epoxy compounds. The coating compositions of this invention are based upon water-insoluble epoxy compounds, the compositions of which show much better salt spray resistance and corrosion resistivity when placed on zinc phosphated steel sheets. These better properties of the epoxy resin esters obtained according to this invention can be derived from the employment of water-insoluble aromatic epoxy compounds which are reacted with organic polycarboxylic acids and contain carboxylic groups and the alcali and/or amine salts are water soluble.

In the prior art there are no coating compositions known that are based on water-unsoluble aromatic epoxy compounds. Also the coating composition of the prior art does not contain epoxy compounds which contain carboxylic groups.

SUMMARY OF THE INVENTION

Having in mind the limitations of the prior art epoxy resin esters wherein organic solvents were required for application, it is an object of the present invention to provide coating compositions and lacquer binders containing epoxy resin esters which are dilutable with water.

Another object of the present invention is a water-dilutable, heat-curable coating composition of vinylized and/or vinylidenized epoxy resin esters.

A further object of the invention is a water-dilutable, heat-curable coating composition containing the epoxy resin ester and low molecular aldehyde condensation products such as phenol resols.

Still another object of the present invention is a water-dilutable, heat-curable coating composition containing the epoxy resin ester and resins which form aminoplasts.

Further objects of the present invention are water-dilutable, heat-curable coating compositions containing the epoxy resin ester reacted with polybasic carboxylic acids.

Still other objects of the present invention are water-dilutable, heat-curable coating compositions comprising the epoxy resin ester reacted with polybasic carboxylic acids and mixed with low molecular aldehyde condensation products such as phenolic resols, and/or etherified phenolic resols, and/or phenol resol carboxylic acids, and/or etherified phenol resol carboxylic acids; and/or resins which form aminoplasts.

On further study of the specification and claims, other objects and advantages of the present invention will become apparent.

The coating compositions according to the present invention which are capable of dilution with water are intended to be used in aqueous or predominantly aqueous solution and consist of:

(I) At least one, and optionally several, hydrophilic plasticized synthetic resins which contain free carboxyl groups;

(II) Ammonia or strong organic nitrogen bases;

(III) Water; and (IV) Heat-curable, water-soluble hydrophilic, low molecular condensation products such as phenolic resols (IVa), aminoplasts (IVb) and etherified phenolic resols (IVc); with the characteristic that the component I which is present is produced by:

(a) First forming partial esters containing hydroxyl groups and optionally also epoxide groups by partial esterification of compounds containing epoxide groups and optionally hydroxyl groups with monocarboxylic acid mixtures with a predominant content of unsaturated aliphatic straight-chain monocarboxylic acids, and then (b) Reacting the partial esters with polybasic carboxylic acids in such a way that the resulting epoxide resin esters containing free carboxyl groups and free hydroxyl groups acquire the ability to be diluted with water by neutralization with ammonia or strong organic nitrogen bases in the presence of water, and (c) Thereafter mixing the epoxide resin esters with such quantities of ammonia and/or strong organic nitrogen bases in the presence of water as are necessary for the esters to appear as synthetic resins which can be sufficiently diluted with water, the process being carried out in such a way that (1) The epoxide resin esters in stage (a) and/or (2) In stage (b) and/or (3) The unsaturated aliphatic monocarboxylic acids employed in the stage (a), and/or (4) The unsaturated adducts of α,β-unsaturated dicarboxylic acids to unsaturated monocarboxylic acids which are preferably employed in stage (b), and/or (5) The monocarboxylic acids used for the production of these adducts, are vinylized and/or vinylidenized with at least one polymerisable vinyl and/or vinylidene compound by heating in the presence of polymerization catalysts.

The preferred embodiment of this invention is a water-dilutable epoxy resin ester coating composition comprising:

(a) Partial esters of compounds containing epoxy groups or hydroxyl groups formed by hydrolytic dissociation of said epoxy groups with monocarboxylic acid mixtures which consist of at least 60% by weight, of aliphatic unsaturated straight chain fatty acids having 10 to 40 carbon atoms, said compounds containing epoxy groups consisting of epoxy resins of the general formula

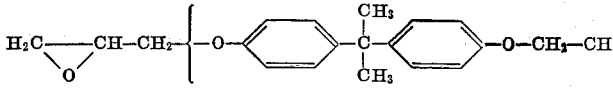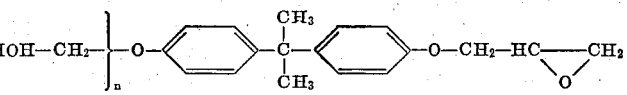

wherein $n$ represents molecular weights of between about 380 and 3500;

(b) Said partial esters of (a) reacted with polybasic carboxylic acids whereby the resulting epoxy ester resins have free carboxyl groups and free hydroxyl groups rendered water-dilutable by neutralization with aqueous ammonia or strong organic nitrogen bases in the presence of water:

(c) Sufficient basic material selected from the group consisting of aqueous ammonia and strong organic nitrogen bases having a pH equal to or greater than 10.0 in 0.05 normal aqueous solution, said basic material in the presence of water whereby the esters are converted into water-dilutable synthetic resins;

(d) Hydrophilic to water-soluble, low molecular weight aldehyde condensation products selected from the group consisting of phenolic resols, etherified phenolic-resols, phenol resol carboxylic acids, etherified phenol resol carboxylic acid resols, urea aldehyde aminoplasts, ethylene-urea aldehyde aminoplasts, dicyandiamide aldehyde aminoplasts and aminotriazine aldehyde aminoplasts; the improvement comprising: vinylized and/or vinylidenized epoxy resin esters produced by heating in the presence of polymerization catalysts on the basis of organic peroxides, which spend radicals in the temperature range of between 120 and 180° C., a compound selected from the group consisting of α,β-vinyl and α,β-vinylidene compounds with the compounds selected from the group consisting of said partial esters of step (a), the reaction products of step (b), said aliphatic unsaturated straight chain fatty acids used in step (a) and said polybasic carboxylic acids, selected from the group consisting of oxalic acid, succinimc acid, glutaric acid, adipic acid, pimelic acid, 2,2,4-trimethyl adipic acid, suberic acid, azelaic acid, sebacic acid, maleic acid, fumaric acid, citraconic acid, mesaconic acid, itaconic acid, phthalic acid, isophthalic acid, terephthalic acid, tetrahydro- and hexahydrophthalic acid, trimellitic acid and hydrolyzed adducts of α,β-unsaturated dicarboxylic acid compounds selected from the group consisting of maleic acid, fumaric acid, mesaconic acid, citraconic acid, itaconic acid and maleic anhydride with aliphatic unsaturated straight chain fatty acids having 10 to 40 carbon atoms, used in step (b); wherein the products of said vinylation and/or vinylidenation are vinyl and/or vinylidene modified epoxy resin esters having free carboxyl groups, free hydroxyl groups and acid numbers between about 35 and 300, and the ratio of the number of free hydroxyl groups to the number of free carboxyl groups is between about 0.2:1 and 2:1.

A further embodiment of this invention comprises the said preferred composition, wherein said epoxy resin esters are the reaction products of compounds containing epoxide groups and optionally hydroxyl groups with compounds selected from the group consisting of unsaturated aliphatic straight chain monocarboxylic fatty acids, monocarboxylic acid mixtures having a predominant content of unsaturated aliphatic straight chain monocarboxylic acid and mixtures of monocarboxylic acids having a predominant content of unsaturated aliphatic straight chain monocarboxylic acids and polybasic carboxylic acids.

Without further elaboration, it is believed that one skilled in the art can, using the preceding description, utilize the present invention to its fullest extent. The following preferred specific embodiments are, therefore, to be construed as merely illustrative and not limitative of the remainder of the specification and claims in any way whatsoever.

In the preferred embodiment of the present invention, the component I is produced in such a way that by choosing the nature and amount of the reaction components as well as by choosing the heating temperature and heating time, possibly also on the basis of the reaction sequence, such vinyl-modified epoxide resin esters are strived for which contain free carboxyl groups, have acid numbers of between 35 to 300, preferably 50 to 120, and contain free hydroxyl groups. In the most preferred method of producing the component I, the aim is that the number of free hydroxyl groups of the vinyl-modified epoxide resin esters should bear a ratio of 0.2:1 to 2:1, especially 0.3:1 to 1.3:1, to the number of carboxyl groups. The various practical methods of producing the component I will be explained in a later part of this description.

These water-dilutable and heat-curable compositions or lacquer binders may contain, as component IV, 1 to 50 percent by weight, relative to the solids content, of heat-curable, water-soluble or at least hydrophilic, low molecular aldehyde condensation products such as phenolic resols and/or etherified phenolic resols and/or phenolic resol carboxylic acids and/or etherified phenolic-resol carboxylic acid resols and/or resins which form aminoplastics.

The lacquer binders combinations of the invention are suitable for the manufacture of predominantly oven-drying lacquers which yield high quality coating not only when using the conventional methods of application such as spraying, dipping, casting and the like, but especially also when used according to the invention as lacquer binders which may be deposited electrophoretically. The coating compositions according to the invention are particularly suitable for the use according to the invention as coating compositions which may be electrophoretically deposited, if the electrophoresis bath contains a solids content of 5–30% by weight.

By water-dilutable coating compositions are to be understood such products as can be dissolved or dispersed in water alone or at least with the addition of a minor quantity of an organic solvent which is infinitely or largely miscible with water, such as for example monoethers and diethers of ethylene glycol and of diethylene glycol with lower monohydric alcohols such as methanol, ethanol, propanol and butanol, such as for example methylglycol, ethylglycol, propylglycol, isopropylglycol, butylglycol, diethylene glycol diethyl ether, and furthermore diacetone-alcohol, and lower ketones, such as acetone, methyl ethyl ketone or methyl isobutyl ketone. Colloidal solutions should preferably be formed.

It may be noted for clarification that the vinyl-modified epoxide resin esters which are present as component I according to the invention either no longer contain any epoxide groups or have a very low content of epoxide groups. The content of epoxide groups of the vinyl-modified epoxide resin esters should be so low that the aqueous solutions neutralized with ammonia or amines should no longer gel on storage.

It has surprisingly been found that the process for the manufacture for the composition of the synthetic resins capable of dilution with water, especially for the component I must not only be suited to the drying conditions of the applied film, but must also depend on the method of application. Synthetic resins which give good results in application processes such as spraying, casting, dipping, flooding, spreading or roller application do not necessarily give equally good results in electrophoretic application. Corresponding differentiations are, therefore, made in the description.

The following abbreviations are used:
Synthetic resins as a constituent of the component I, which serve for the manufacture of coating materials which can be electrophoretically deposited and are to be stoved=EC binders;
Synthetic resins as a constituent of component I, for coating materials which are to be stoved but which cannot be electrophoretically deposited=E binders.

The synthetic resin combinations of this invention are particularly suitable for use according to the invention as coating compositions which can be electrophoretically deposited if the aqueous electrophoresis bath has a solids content of 5 to 30% by weight.

For the manufacture of component I, suitable compounds containing epoxide groups and possibly also hydroxyl groups are for example the following:

Epoxidized olefins, diolefins and oligo-olefins such as 1,2,5,6-diepoxyhexane and 1,2,4,5-diepoxyhexane, epoxidized olefinically or diolefinically unsaturated carboxylic acid esters with monohydric or polyhydric alcohols, such as for example diepoxystearic acid esters or monoepoxystearic acid esters of methanol, ethanol or propanol, including its isomers; bis-(dieoxystearic acid) esters and/or bis-(monoepoxystearic acid) esters of polyhydric alcohols such as ethylene glycol, 1,2- or 1,3-propylene glycol, 1,2-, 2,3-, and 1,4-butylene glycol, neopentyl glycol, 1,6-hexanediol, glycerol, trimethylolpropane, trimethylolethane or pentaerythritol; tri-(diepoxystearic acid) and/or tri-(monoepoxystearic acid) esters of glycerol, trimethylolpropane, trimethylolethane or pentaerythritol, and tetra-(diepoxystearic acid) esters and/or tetra-(monoepoxystearic acid) esters of pentaerythritol. Further possible substances are: epoxidized unsaturated oils such as, for example, soya oil, safflower oil, dehydrated castor oil alone or in mixtures; epoxidized compounds having several cyclohexenyl residues, such as diethylene glycol-bis-(3,4 - epoxyicyclohexane-carboxylate), 3,4 - epoxicyclohexylmethyl-3,4-epoxyicyclohexanecarboxylate and vinylcyclohexene dioxide.

Polyesters with epoxide groups, such as can be produced by reaction of a dicarboxylic acid with epihalohydrin or diahalohydrin, such as for example epichlorohydrin, dichlorohydrin or the like in the presence of alkali, are particularly suitable. Such polyesters can be derived from aliphatic dicarboxylic acids such as oxalic acid, succinic acid, glutaric acid, adipic acid, pimelic acid, suberic acid, azelaic acid, sebacic acid or from aromatic dicarboxylic acids such as phthalic acid, isophthalic acid, terephthalic acid, 2,6-naphthylene-dicarboxylic acid, diphenyl-o,o'-dicarboxylic acid and ethylene glycol-bis-(p-carboxyphenyl)-ether, which are employed individually or as mixtures.

They correspond essentially to the formula:

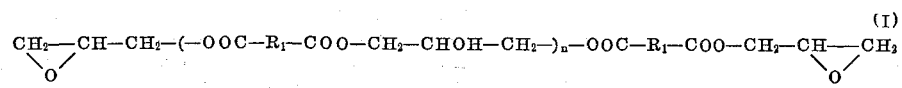

(I)

wherein $R_1$ denotes an aliphatic or aromatic radical and $n=0$ or a small number. Those compounds of the above formula whose molecular weight does not exceed 3000 are very suitable. Those whose molecular weight lies between 300 and 750 are preferred.

The most suitable compounds are polyethers with epoxide groups, such as are obtained by etherification of a dihydric alcohol or diphenol with epihalohydrins or dihalohydrins, for example with epichlorohydrin or dichlorohydrin in the presence of alkali. These compounds can be derived from glycols such as ethylene glycol, diethylene glycol, triethylene glycol, propylene glycol-1,2, propylene glycol-1,3, butylene glycol-1,4, pentanediol-1,5, hexanediol-1,6 and especially from diphenols such as resorcinol, pyrocatechol, hydroquinone, 1,4-dihydroxynaphthalene, bis-(4-hydroxyphenyl)-methane, bis-(4-hydroxy-phenyl)-methyl-phenylmethane, bis - (4 - hydroxyphenyl)-tolylmethane, 4,4'-dihydroxydiphenyl and 2,2-bis-(4-hydroxyphenyl)-propane.

The polyethers containing epoxide groups have the general formula:

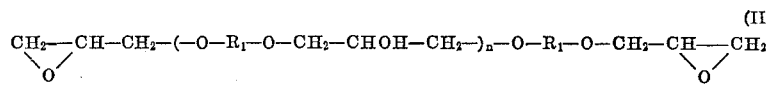

(II)

wherein $R_1$ denotes an aliphatic or aromatic radical and $n=0$ or a small number.

Compounds to be very particularly preferred are polyethers containing epoxide groups of the general formula:

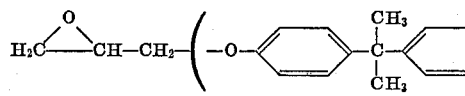 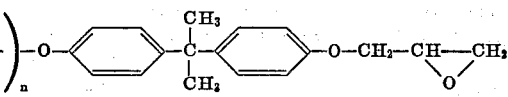

which contain 2,2-bis-(4-hydroxyphenyl)-propane as the starting compound, of which those polyethers are again preferentially used which have a molecular weight of between approximately 380 and approximately 3,500.

Preferentially suitable components I for coating compositions which can be deposited electrophoretically are those polyethers which have a molecular weight of 380 to approximately 3,500.

Preferentially suitable components I for coating compositions which can be deposited electrophoretically are those polyethers which have a molecular weight of 380 to approximately 750. While those of higher molecular weight are also suitable, since they also yield highly corrosion-resistant films, it is however more difficult to achieve high coating thicknesses. For water-dilutable coating compositions which are applied by conventional methods of application such as dipping, spraying, flooding, casting or spreading, it is also possible to use polyethers of higher molecular weight.

Furthermore it is also possible to employ the polyglycidyl ethers—this term being understood to mean ethers having 2 or more glycidyl residues—of trihydroxy and polyhydroxy compounds. As such there may be mentioned: trimethylolpropane triglycidyl ether, trimethylolethane triglycidyl ether, glycerol triglycidyl ether, pentaerythritol triglycidyl ether, pentaerythritol tetraglycidyl ether, or polyglycidyl ethers of esters of polyhydric alcohols and hydroxy-acids, for example diglycidyl or triglycidyl ethers of tri-ricinoleates or of castor oil.

Among the polyglycidyl ethers, those which are obtained in a known manner (German published specification 1,184,496 and German patent specification 1,138,542) by reaction of novolacs based on phenol, cresol, xylenol or bisphenols with epichlorhydrin are very suitable. Further epoxides and/or epoxide resins having epoxide groups or epoxide groups and hydroxyl groups and a molecular weight of up to about 3000 are described in large numbers in the book "Epoxidverbindungen und Epoxidharze" (Epoxide Compounds and Epoxide Resins), by A. M. Paquin, Springer Verlag 1958, Berlin, Göttingen/Heidelberg.

It should be pointed out that the compounds mentioned may be in most cases also employed if the epoxide groups have already been partially or completely hydrolytically decomposed, i.e. so that dihydroxy or polyhydroxy compounds are already present.

Suitable monocarboxylic acid mixtures are those mixtures which consist at least predominantly, that is to say to the extent of at least 60% by weight, of aliphatic unsaturated straight chain monocarboxylic acids.

Suitable monobasic aliphatic carboxylic acids are straight chain unsaturated fatty acids having 10 to 40 carbon atoms such as palmitoleic acid, petroselinic acid, oleic acid, elaidic acid, 9,12-linoleic acid, 9,11-linoleic acid, (in the cis, cis-trans and trans-trans form), linolenic acid, elaeostearic acid, lignoceric acid, erucic acid, arachidic acid, clupanodonic acid α-parinaric acid, α-licanic acid, as well as their anhydrides, individually or as mixtures. Fatty acid mixtures are preferably used which are obtained from natural vegetable and animal fats, such as cottonseed oil, peanut oil, wood oil, corn oil, oiticica oil, olive oil, poppy-seed oil, Boleco oil, olive kernel oil, perilla oil, rape oil, sunflower oil, walnut oil, grapeseed oil, sardine oil, herring oil, menhaden oil, whale oil and especially linseed oil, soya oil, and safflower oil.

The following can also be used: technical fatty acids, especially tall oil fatty acids, chemically treated fatty acids or fatty acids from chemically treated fats, especially dehydrated castor oil fatty acids, or conjugated fatty acids treated by catalytic processes, fatty acids from catalytically conjugated fats, especially conjugated linseed oil, soya oil and safflower oil fatty acids, fatty acids which have been elaidinated by catalytic processes or fatty acids from elaidinated fats, partially hydrogenated fatty acids or fatty acids from partially hydrogenated fats, for example partially hydrogenated fish oils or mixtures of such acids or of acid mixtures of the above-mentioned nature with one another, as well as fatty acid mixtures which as an admixture contain rosin acids, especially colophony and/or partially hydrogenated rosin acids, especially partially hydrogenated colophony individually or as mixtures.

Excellent results are obtained with so-called technical linoleic acids which are obtained by distillation and which are distinguished by a high linoleic acid content (above 50% by weight), a low content of saturated fatty acids (below 10% by weight) and only a very low content of linolenic acid (less than 2% by weight).

Under the term monobasic carboxylic acids there are also to be understood partial esters of polybasic unsaturated carboxylic acids which contain only one remaining free carboxyl group, especially partial esters of dimerized or oligomerized unsaturated fatty acids and/or partial esters of the "tricarboxylic acids" which cannot be exactly defined chemically and which are produced by the formation of adducts of α,β-unsaturated dicarboxylic acids or their anhydrides to unsaturated fatty acids, with preferably straight chain saturated aliphatic alcohols having 1 to 20 carbon atoms, such as methanol, ethanol, and propanol, especially butanol, pentanol, hexanol and the like. Methanol is herein preferred.

Suitable polybasic carboxylic acids are individual or mixed dicarboxylic and polycarboxylic acids, for example oxalic acid, succinic acid, glutaric acid, adipic acid, pimelic acid, 2,2,4-trimethyladipic acid, fumaric acid, citraconic acid, mesaconic acid, itaconic acid, phthalic acid, isophthalic acid, terephthalic acid, tetrahydrophthalic acid and hexahydrophthalic acid, trimellitic acid or, to the extent that they exist, their anhydrides. Among the dicarboxylic acids there may be high-lighted the polybasic acids obtained by dimerization or oligomerization of unsaturated fatty acids.

As polybasic carboxylic acids the "tricarboxylic acids" which cannot be exactly defined chemically are preferably used which are produced by addition of α,β-unsaturated dicarboxylic acids or their anhydrides, to the extent that they are capable of forming these, such as maleic acid, fumaric acid, mesaconic acid, citraconic acid, itaconic acid or their anhydrides, among which maleic anhydride deserves priority, to unsaturated fatty acids such as palmitoleic acid, petroselinic acid, oleic acid, elaidic acid, cis-cis-, cis-trans- and trans-trans-9,12-linoleic acid, cis-cis, cis-trans and trans-trans-9,11-linoleic acid, linolenic acid with isolated and conjugated double bonds, elaeostearic acid, erucic acid, arachidonic acid, clupanodonic acid, licanic acid or parinaric acid individually or as mixtures. In particular fatty acid mixtures are used as unsaturated fatty acids which are obtained by saponification from natural vegetable and animal unsaturated fats, such as fatty acids from cottonseed oil, lupin oil, corn oil, rape oil, wood oil, sesame oil, grapeseed oil, walnut oil, perilla oil, linseed oil, oiticica oil and especially soya oil, poppyseed oil, sunflower oil and safflower oil. Furthermore unsaturated technical fatty acids, especially tall oil, are especially suitable. Among chemically treated fatty acids or fatty acids from chemically treated oils, fatty acids from dehydrated castor oil are particularly suitable, while conjugated and/or elaidinated fatty acids obtained by catalytic processes, or fatty acids from catalytically conjugated and/or elaidinated fats, for example isomerized soya oil, safflower and linseed fatty acids, although usable, do not belong to the preferred group. Other suitable unsaturated acids are rosin acids, for example colophony or partially hydrogenated rosin acids, but as a rule only as admixtures of up to about 50% by weight to the above-mentioned fatty acids. The fatty acids listed may be used individually or as mixtures with one another.

The adduct formation takes place by heating in accordance with the known methods, among which Diels-Alder reactions and the so-called "substituting addition" (H. Wagner-H. F. Sarx "Lackkunstharze" (Synthetic resins for lacquers), 1959, Karl Hanser Verlag, page 87) represent the main reactions. The molar ratio of $\alpha,\beta$-unsaturated dicarboxylic acids to unsaturated fatty acids may vary and naturally also depends on the nature of the fatty acids used, but adducts in which the ratio is between 0.9:1 and 1.1:1 are preferred.

The adduct formation may also be carried out with the oils, i.e. triglycerides. The saponification then takes place subsequently. It is equally possible to catalyze the isomerization of the fatty acids during the adduct formation.

The risk of polymerization during the adduct formation can be reduced by adding antioxidants being usually used for this purpose. Oils of relatively low viscosity are obtained. Additives, such as for example triphenylphosphite, which are known to have a favorable effect on the color, permit light-colored adducts to be obtained even when using raw materials of inferior quality.

Contrary to the generally prevailing view that adducts of $\alpha,\beta$-ethylenically unsaturated dicarboxylic acids to trans-trans isomerized fatty acids must be used for the manufacture of water-soluble synthetic resins, since polymeric polybasic products which are supposedly unsuitable for the manufacture of water-soluble synthetic resins result when other fatty acids are used (see R.V. Crawford, P. A. Toseland "Fette, Seifen, Anstrichmittel" (Fats, Soaps and Paints) 66, 1083 (1964) it has been surprisingly found that it is the adducts of exactly such non-isomerized fatty acids that are more suitable. Even when using fatty acids from dehydrated castor oil, which are employed mixed with other fatty acids for the adduct formation, lower viscosities are obtained than with isomerized fatty acids.

The following table shows a comparison of the viscosity of Admerginat(R) A* (adduct of isomerized fatty acids and maleic anhydride) with the viscosities of adducts of non-isomerized fatty acids:

| | Admerginat (R) A hydrolyzed | Adduct (hydrolyxed) | | | | |
|---|---|---|---|---|---|---|
| | | 1 | 2 | 3 | 4 | 5 |
| Gardner-Holdt viscosity, 66.6% strength by weight in n-butyl glycol. | T+ | G-H | G+ | F | H | F+ |

Adduct 1

30% by weight dehydrated castor oil fatty acid,
45% by weight distilled tall oil fatty acid, containing about 1% by weight rosin, and
25% by weight maleic anhydride are converted to the adduct in a known manner by heating. Content of free maleic anhydride after adduct formation: less than 1% by weight of the amount of maleic anhydride employed.

Adduct 2

45% by weight dehydrated castor oil fatty acid,
30% by weight tall oil fatty acid, distilled, containing less than 1% by weight rosin, and
25% by weight maleic anhydride

*Admerginat A is a commercial product of Bibby & Sons Ltd. Great Britain as cited in French Pat. 1,388,543 and leaflet Admerginate of Messrs. Brinckman & Mergell G.m.b.H., Hamburg-Harburg, Germany.

are converted to the adduct in a known manner by heating. Content of free maleic anhydride after adduct formation: less than 1% by weight of the amount of maleic anhydride employed.

Adduct 3

75% by weight Safflower oil, non-breaked, and
25% by weight of maleic anhydride are converted to the adduct in a known manner by heating. Content of free maleic anhydride after adduct formation: less than 1% by weight of the amount of maleic anhydride employed.

Adduct 4

75% by weight safflower oil, non-breaked, and
25% by weight maleic anhydride are converted to the adduct in a known manner by heating. Content of free maleic anhydride after adduct formation: less than 1% by weight of the amount of maleic anhydride employed.

Adduct 5

75% by weight distilled tall oil fatty acid, containing less than 1% by weight rosin, and
25% by weight maleic anhydride are converted to the adduct in a known manner by heating. Content of free maleic anhydride after adduct formation: less than 1% by weight of the amount of maleic anhydride employed.

After being prepared, the adducts were hydrolyzed with water 2 hours at 100° C. The reaction temperature during the adduct formation was 180 to 200° C.

The viscosity ranges of the adducts can be adjusted by selecting and mixing suitable fatty acids, as may also be seen from the experiments mentioned above. Easily polymerizable fatty acids tend to form highly viscous adducts while fatty acids of semi-drying oils such as soya oil or safflower oil yield adducts of low viscosity. Very highly viscous adducts are obtained from isomerized fatty acids and also from dimerized fatty acids so that in the preferred modification these components are only to be regarded as admixtures. Furthermore, the viscosity can be influenced by the reaction time, the reaction temperature and the sequence of the reaction of the fatty acids with the $\alpha,\beta$-ethylenically unsaturated dicarboxylic acids, and in the case of E-binders additionally also by the degree of addition of the $\alpha,\beta$-ethylenically unsaturated dicarboxylic acids to the unsaturated fatty acids. The amount of the non-combined $\alpha,\beta$-ethylenically unsaturated dicarboxylic acids should however in this case not exceed 10% by weight of the amount employed. In the case of E-binders, the content of free maleic anhydride must after adduct formation be less than 1% by weight of the amount employed. In agreement therewith is the observation that at a given viscosity the acid number when esterifying epoxide resin reaction products of epoxide resins and monobasic fatty acids with these adducts, can be reduced more in percentage terms than when using hydrolyzed adducts of isomerized fatty acids and maleic anhydride, such as for example the commercial Admerginat ® A. Epoxide resin partial esters of the adducts of natural fatty acids also show better water solubility. They also show a lighter color because the adducts of natural fatty acids already exhibit lower iodine color numbers. Furthermore, partial esters of polycarboxylic acids are also understood to be included under polybasic carboxylic acids, but these must still fulfill the condition of being polybasic carboxylic acids. Suitable substances are, in particular, partial esters of polybasic carboxylic acids with saturated straight chain aliphatic monoalcohols having 1 to 20 carbon atoms. Among these the partial esters of the "tricarboxylic acids" described above which cannot be exactly defined chemically, and which were obtained by adduct formation of α,β-unsaturated dicarboxylic acids or their anhydrides and unsaturated fatty acids, are particularly suitable. Such partial esters are obtained either:

(a) By reaction of α,β-unsaturated dicarboxylic acids or their anhydrides with esters of the above-mentioned unsaturated fatty acids and preferably saturated, straight chain, aliphatic monoalcohols having 1 to 20 carbon atoms such as methanol, ethanol, propanol, butanol, pentanol, hexanol and the like, especially methanol, or (b) By partial esterification of the resulting adduct with preferably saturated straight chain aliphatic monoalcohols having 1 to 20 carbon atoms such as methanol, ethanol, propanol, butanol, pentanol, hexanol and the like, especially methanol.

The polybasic carboxylic acids obtained according to the methods described under (a) and (b) respectively are not identical. The synthetic resins capable of dilution with water which are prepared from them show differing behaviours, for example as regards storage stability. Their behaviours in the process of this invention are also different; the polybasic carboxylic acids produced by the method described under (b) as a rule require a somewhat higher esterification temperature. The polybasic carboxylic acids obtained by the method described under (b) are preferred.

The production of the partial esters of compounds containing epoxide groups and optionally hydroxyl groups, or of polyhydroxyl compounds which have been obtained by hydrolytic decomposition of compounds carrying epoxide groups, with monobasic carboxylic acids, is carried out by heating and can in cases where water of reaction is formed be accelerated by adding azeotropic agents which remove the water of reaction, for example xylene, or by working under reduced pressure. It is appropriate to remove the azeotropic agent before the subsequent esterification with polybasic carboxylic acids. The esterification preferably takes place to the point that the acid number of the partial ester is practically nil. The esterification is facilitated by adding basic catalysts, which accelerate the splitting open of the epoxide groups, such as for example anhydrous sodium carbonate or other compounds. As a result of such addition, resins of lower viscosity are at the same time obtained. The use of catalysts should however be dispensed with as far as possible when manufacturing EC binders in order not to increase unnecessarily the content of foreign ions in the bath solution.

When esterifying polybasic carboxylic acids with epoxide resin partial esters, it is necessary to observe the fact that when using mixtures of polybasic carboxylic acids having carboxyl groups of differing reactivity, the partial esterification must as a rule not take place simultaneously but successively in time, and indeed in such a way that the acids with the slowly reacting carboxyl groups are partially esterified first, mostly at a higher temperature, and that those with more readily reactive carboxyl groups are partially esterified subsequently, frequently at lower temperatures.

In order to be able to exert good control over the reaction, the esterification is carried out at as low a temperature as possible. In general, 160° C. should not be exceeded during this reaction.

The degree of esterification is preferably so chosen that the polybasic carboxylic acid is bonded to the epoxide resin or to the polyhydroxyl compound by approximately 1 carboxyl group. A small proportion of unreacted polybasic carboxylic acid, which may remain in the reaction product, is as a rule of no significance.

The ratio between the compounds carrying epoxide groups and optionally hydroxyl groups, or such polyhydroxy compounds as have been obtained by hydrolytic decomposition of compounds containing epoxide groups, and monobasic and polybasic carboxylic acids, may vary within wide limits. It naturally depends on the nature and molecular size of the polybasic carboxylic acids used and of the compounds carrying epoxide groups and optionally hydroxyl groups.

When manufacturing the component I in the form of the synthetic resins capable of dilution with water by partial esterification of epoxide resins based on bisphenol-A and epichlorhydrin with aliphatic carboxylic acids and adducts of α,β-unsaturated dicarboxylic acids to unsaturated fatty acids, very good resins are obtained if the ratio of hydroxyl groups (an epoxide group is calculated as 2 hydroxyl groups; phenolic hydroxyl groups are left out of account) to carboxyl groups (1 anhydride group is counted as 2 carboxyl groups) in the starting mixture falls within the range of 1:0.8 to 1:2. A ratio lying within the range of 1:1 to 1:1.4 is preferred.

If a very high excess of carboxyl groups is chosen, so that the epoxide resin is almost completely esterified, a subsequent partial esterification of the epoxide resin ester with monohydric and/or polyhydric alcohols may be of advantage. As monohydric alcohols there may be quoted: methanol, ethanol, propanol, isopropanol, n-butanol, isobutanol, sec-butanol, pentanol, hexanol and the like, and as polyhydric alcohols there may be mentioned: ethylene glycol, 1,2- and 1,3-propylene glycol, 1,2-, 1,3-, 2,3- and 1,4-butylene glycol, neopentyl glycol, glycerol, trimethylol-propane, trimethylol-ethane, pentaerythritol and the like.

The considerable increase in viscosity on esterifying high molecular epoxide resin partial esters with polybasic carboxylic acids can under certain circumstances lead to difficulties in manufacture. It is possible to carry out the esterification in the presence of such solvents as do not participate in the esterification reaction. Solvents which are at least partially miscible with water are preferred, such as for example glycol or diglycol diethers, such as ethylene glycol-diethyl ether, diethylene glycol-diethyl ether or also ketones such as for example methyl isobutyl ketone. These solvents need as a rule not be removed since they do not impair the ability of the resin to be diluted with water.

If solvents which are not soluble in water are used, they must be removed before neutralization.

The properties of the resin of component I as regards elasticity, hardness and corroison protection of the lacquer films manufactured therefrom, but also for example the amount deposited when using the electrophoretic lacquering process, may be influenced by the selection of the carboxylic acids and by the selection of the ratios. The mixing ratio of the components which are reacted, namely epoxide compound, and monobasic and polybasic carboxylic acids, and the degree of esterification between the epoxide resin partial ester and the polybasic carboxylic acid, must however in all cases be so chosen that after neutralization with aqueous ammonia solution or strong organic nitrogen bases resins which are soluble or dispersible in water are produced.

In the case of epoxide resins which contain a high number of epoxide groups the reaction can be so conducted that the reaction products with polybasic acids are already water-soluble after neutralization but that the aqueous solutions still gel after some time. In general this property is undesirable. In order to achieve adequate storage stability, the reaction should be taken to a point that the number of epoxide groups still present is low. It is also possible to esterify to the point that there are no further epoxide groups present.

This method of manufacture—partial esterification of the epoxide compounds with monocarboxylic acids and subsequent reaction with polybasic carboxylic acids to give acid epoxide resin esters—carries with it the great advantage that the carbon double bonds of the unsaturated fatty acids, which are of great importance for film formation, are preserved.

The film formation may be accelerated by adding known catalysts, so-called driers.

The reaction with vinyl and/or vinylidene compounds takes place with warming, preferably under the influence of polymerization catalysts.

As polymerization catalysts can be used organic peroxy compounds and/or organic hydroperoxy compounds, preferred are such liquid compounds having decomposition temperatures in the ranges from 120 and 160° C., such compounds can be found in Kirk-Othmer Encyclopedia of Chemical Technology Volume 14, second edition, pages 766–820. Examples for such liquid compounds are benzoylperoxides, tert.-butylhydroperoxide, cumolhydroperoxide, di-tert.-butylperoxide, tert.-butylperbenzoate, tert.-butylperoctoate, tert.-butylamylperoxide, tert.-butylperpivalate. An example for a solid compound is laroylperoxide. The most preferred catalyst consists of di-tert.-butylperoxide. In the preferred embodiment, the vinyl and/or vinylidene monomer mixture to be reacted contains, in 1800 g., at least one acid equivalent (expressed in grams), which is introduced by at least one unsaturated carboxylic acid capable of copolymerization with the vinyl and/or vinylidene compounds.

In the case of relatively weakly polar monomers such as styrene, α-methylstyrene or vinyltoluene, 2 to 4 acid equivalents should preferably be present in 1800 g. In the case of more strongly polar monomers such as acrylic acid and methacrylic acid esters of short chain aliphatic monoalcohols or diols, 1 to 3 acid equivalents in 1800 g. of total monomer mixture are preferred.

The reaction temperatures in the ranges from 120° C. and 180° C. during the reaction with the vinyl and/or vinylidene compounds depend on the catalyst system used. Reaction temperatures of between 120 and 160° C. are preferred as the most advantageous ranges, using di-tert.-butyl peroxide, optionally combined with a chain stopper, preferably lauryl mercaptan. At low temperatures, say above 120° C., the reaction mixture is frequently too viscous for easy processing, and furthermore, the reaction speed, which can be followed through the increase in solids content, is rather slow for many monomers. At high temperatures, say above 180° C., products of lower viscosity are obtained even on purely thermal polymerization; these are however poorer as regards the salt spray resistance of the stoved coatings manufactured from them.

The speed of reaction can be increased by $Co^{++}$ salts, for example $CoCl_2$ in amounts of 3 to 6 parts per million. The same reaction times are however also achieved by the presence of "V4A material," "V4A material" is disclosed in the Chemie Lexikon, 4th Edition of Dr. Hermann Römpp, Frankh'sche Verlagshandlung, Stuttgart, cols. 4629 to 4632 and is a trade name for a corrosion resistant alloy of iron, nickel and chromium.

The water-solubility of the total system of component (I) is increased by the conjoint use of monomers containing carboxyl groups. Thus even the water-solubility of an epoxide resin ester which had been modified with approximately 10% by weight of vinyltoluene and which contained 2 acid equivalents in 1800 g. of monomer mixture, introduced through acrylic acid and reacted in the presence of a catalyst mixture of di-tert.-butyl peroxide, lauryl mercaptan in the ratio of 1:1.05 at 140 to 150° C., is significantly better than that of an epoxide resin ester which has been reacted with only vinyl toluene at 200° C., and which has an even lower viscosity. The film properties of component I can be influenced by the choice of the vinyl and vinylidene monomers. Possibly vinyl monomers for the manufacture of component I are the alkyl esters of α,β-unsaturated monocarboxylic acids such as methylacrylate, ethyl acrylate, propyl acrylate, n- and/or iso-butyl acrylate, octyl acrylate, 2-ethylhexyl acrylate, decyl acrylate, lauryl acrylate, as well as the corresponding methacrylates, ethacrylates and phenylacrylates, propyl crotonate, butyl crotonate and the like, and further hydroxyalkyl esters of α,β-unsaturated carboxylic acids such as 2-hydroxyethyl acrylate, 2-hydroxymethyl acrylate, 2-hydroxypropyl acrylate, 2-hydroxybutyl acrylate, 3-hydroxybutyl acrylate, 6-hydroxyhexyl acrylate and the corresponding methacrylates, ethacrylates, and phenylacrylates, 2-hydroxyethyl maleate, di-(2-hydroxypropyl) maleate and/or the corresponding fumarates, 2-hydroxy-3-chloropropyl acrylate, 2-hydroxy-1-phenylethyl acrylate, 2-hydroxy-3-butoxypropyl acrylate and the corresponding ethacrylates and phenylacrylates, but also other polymerizable vinyl and vinylidene compounds such as styrene, nuclear-substituted styrenes, (o-, m- and p-methylstyrene, ethylstyrene, propylstyrene, n-butylstyrene, 2,4-, 2,3- and 2,5-dimethylstyrene, 2,4- 2,3- and 2,5-dichlorostyrene), styrenes substituted in the side chain such as α-methyl styrene, α-ethylstyrene, α-chlorostyrene, etc.

Of these monomers, the following are preferably employed: methylacrylate, methyl methacrylate, ethyl acrylate, ethyl ethacrylate as well as 2-hydroxyethyl acrylate and 2-hydroxypropyl acrylate. The preferred monomers further include styrene, α-methylstyrene and vinyltoluene individually or as mixtures. Suitable monomers carrying carboxyl groups, which must be capable of copolymerization with the above-mentioned monomers, are acrylic acid or methacrylic acid, cinnamic acid, β-benzoylacrylic acid, crotonic acid and the like, and furthermore α,β-ethylenically unsaturated polycarboxylic acids or their anhydrates, to the extent that they are capable of forming these, such as maleic acid, fumaric acid, itaconic acid, citraconic acid, mesaconic acid, aconitic acid or monoesters of the above-mentioned polycarboxylic acids with saturated straight chain monoalcohols having 1 to 4 carbon atoms, preferably methanol, halogen-substituted acids such as chloromaleic acid, and the like.

The preferred α,β-ethylenically unsaturated monocarboxylic acids include acrylic acid and methacrylic acid. The monomers carrying carboxyl groups can be reacted individually, as mixtures with one another, individually but mixed with the initially mentioned monomers which do not carry any carboxyl groups, or as mixtures with the latter.

Other polymerizable monomers can be admixed, individually or as mixtures, to the monomer mixture, such as acrylamide, methacrylamide, acrylonitrile, methacrylonitrile and similar compounds.

The vinyl proportion in the plasticized synthetic resin (component I) depends on the envisaged field of application of the binder. EC binders may have been modified with 2 to 25% by weight of vinyl and/or vinylidene compounds, preferably with 5 to 15% by weight. With EC binders care must especially be taken that the reaction be complete, i.e. that the proportion of residual monomer should be very low. Where the proportion of residual monomer is too high, difficulties can arise in the separation and also as regards pigment compatibility. To the extent that the reaction is incomplete, the excess monomer must be removed from the resin.

E-binders may have been modified with 2 to 45% by weight of vinyl and/or vinylidene compounds, preferably with 15 to 35% by weight.

However not only the proportions but also of course the nature of the monomers exert a decisive influence. Styrene, vinyltoluene and α-methylstyrene, particularly vinyltoluene, are preferable as suitable EC-binders. Using these, binders are arrived at which are distinguished by outstanding resistance to salt spray, high attainable coating thicknesses with low sensitivity to field strength, good penetration depth, high pigment receptivity, good water-solubility and relatively low viscosity of the concentrated aqueous solutions.

In the case of E-binders, however, outstanding results are also obtained when using acrylic esters, especially if high gloss is demanded.

The epoxide resin esters and the vinyl and/or vinylidene monomers must be so chosen as regards their nature and quantity, that the vinyl-modified films, from the neutralized dilute solutions, when using EC binders and E binders are clear and homogeneous.

The sequence of reaction of the components which are the minimum of those required for the production of the vinyl-modified epoxide resin esters (component I), namely epoxide resin, monocarboxylic acid, polycarboxylic acid and vinyl compounds, can be varied. However, it should be taken into account that when changing the sequence, products with equivalent properties are not always obtained.

Brief designation of the components which may be used:

A = unsaturated monocarboxylic acids
B = polycarboxylic acids or anhydrides
$B_1$ = adducts of $\alpha,\beta$-ethylenically unsaturated dicarboxylic acids or anhydrides to A, to the extent that A is practically free of hydroxyl groups.
$B_{1h}$ = $B_1$ hydrolyzed so as to be free of anhydride groups.
C = epoxide resins
D = vinyl and/or vinylidene compounds, preferably containing at least 1 gram equivalent of acid in 1800 grams of monomer mixture.

The following requirements are demanded of the sequence of reaction of the components to give the vinyl-modified epoxide resin ester:

(1) The reaction with D must take place in a step in which compounds with ethylenically unsaturated double bonds are present in the reaction mixture, which have been introduced into the system by at least one of the components A, $B_1$ and $B_{1h}$, preferably through component A.

(2) The proportion of fatty acids introduced into the vinyl-modified epoxide resin ester through component A should be at least 10% by weight.

(3) The polyhydroxy compounds C carrying epoxide groups should preferably not be reacted with anhydrides but only with free carboxylic acids.

(4) When reacting the partial esters with polycarboxylic acids or optionally with their anhydrides, the course of the reaction should be so chosen that the polycarboxylic acids are usually bonded by esterification through one carboxyl group.

(5) The proportion of polycarboxylic acids or their anhydrides should be so high that synthetic resins which are sufficiently dilutable with water are produced by neutralization with ammonia or amines.

(6) In the preferred embodiment, no conditions should be employed after the reaction with D under which an esterification of the carboxyl groups would take place which have, in the preferred embodiment, been introduced by the carboxylic acids which are capable of copolymerization. This requirement applies to EC binders and E binders. If these carboxyl groups are esterified the water-solubility of the binder declines.

The preferred embodiments are as follows:
The components listed in brackets are only used optionally. The reactions of the components must as a rule take place in time sequence, and only in certain cases may several components be simultaneously reacted.

If several components have to be pre-reacted in a separate batch and only thereafter reacted with the remaining reaction components, then these are shown in square brackets.

Good results are obtained with the following procedure for the manufacture of the component I:

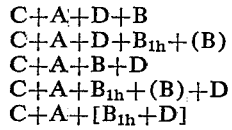

The most advantageous embodiment is:

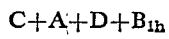

Furthermore, the carboxyl-hydroxyl group ratio, the acid number, and especially for EC binders, the viscosity of the plasticized synthetic resins are of great importance for the properties of the component I according to this invention.

The reaction of the components should lead to as low acid numbers of the plasticized synthetic resins (component I) as possible because the film properties are improved as the acid number declines. Since, however, the acid number is also partly responsible for the water-solubility of the system, the most advantageous value must be experimentally determined in each case. In most cases it has proved particularly advantageous to use acid numbers of between 50 and 120, and to increase the water-solubility by incorporating numerous hydrophilic groups into the resin molecule. For EC binders it has in particular proved very advantageous to use acid numbers of below 80.

The acid numbers are determined by titration of a solution of the resin in xylene/n-butanol with n/10 KOH solution in isopropanol, using phenolphthalein. If anhydride groups are still present in the resin, a preliminary hydrolysis by two hours heating to 100° C. with water is required. The amount of water should be twice the theoretically required amount.

The hydroxyl numbers of the vinyl-modified epoxide resin esters should, in the preferred embodiment, bear a ratio of 0.2:1 to 2:1, especially 0.3:1 to 1.3:1, to the acid numbers.

In contrast to the acid number, the hydroxyl number is not determined experimentally but calculated taking the determined acid number into account. Phenolic hydroxyl groups are left out of account; epoxide groups are counted as two hydroxyl groups.

Etherification reactions which may possibly have occurred are regarded as not having occurred when calculating the hydroxyl number. Only esterification reactions are taken into account.

It has proved important, especially when using the component I for the manufacture of coating materials which can be electrophoretically deposited, that the viscosity of the vinyl-modified epoxide resin esters should be kept within certain viscosity limits if universally applicable binders are to be obtained. It has been found that the molecular weight and the molecular weight distribution of the vinyl-modified epoxide resin esters strongly influence the electrical film resistance. The film resistance increases with increasing molecular weight, i.e. with increasing viscosity. It has, therefore, proved important that not only should the main molecular weight be within certain values, but also that the molecular weight distribution should be kept within as narrow limits as possible. It is therefore not appropriate to use starting substances of high molecular weight for the manufacture of the vinyl-modified epoxide resin esters, or to allow the molecular weight to rise too high in the individual reaction stages.

Particularly good results are achieved if the viscosity of the plasticized synthetic resins (component I), measured at 50% strength by weight in n-butoxy-ethanol, falls within the range B to Q (Gardner-Holdt viscometer). In the case of the best resins the viscosity falls within the range C to H.

In the preferred embodiment, the viscosity should, when manufacturing the component I, not rise above the viscosity of the final product in any stage of the manufacture.

In the case of E binders, the viscosity range is not so important since the processing viscosity can be adjusted by adding solvents. Of course the resins must always remain soluble in suitable solvents.

Aqueous ammonia solution or strong organic nitrogen bases, such as triethylamine, diethylamine, trimethylamine, piperidine, morpholine or monoethylamine, used individually or as mixtures, are suitable for the neutralization of the vinyl-modified epoxide resin ester (component I).

The following are also very suitable: tertiary, secondary or primary alkylolamines such as for example triethanolamine, diethanolamine, monoethanolamine, N-dimethylethanolamine, N-methylethanolamine, N-diethanolamine, monoisopropanolamine, diisopropanolamine, triisopropanolamine and polyglycolamines, preferably diglycolamine. The following can also be used: butanolamine, hexanolamine, methyldiethanolamine, octanolamine and polyamines such as ethylene diamine, diethylene triamine and triethylene tetramine, but the latter as a rule only when mixed with monoamines.

By the term strong organic nitrogen bases are understood those whose 0.05 normal aqueous solutions have a pH≧10.0, measured at 25° C.

Triethylamine, diethylamine and N-dimethylethanolamine are particularly suitable for EC binders.

The following are preferentially suitable for E binders: aqueous ammonia solution, diethylamine, triethylamine and N-dimethylethanolamine.

It is not always necessary to use the amount of nitrogen bases theoretically required for neutralization; adequate water-solubility is frequently achieved with lesser quantities.

Colloidal solutions, which may appear either clear or cloudy, should preferably result.

The combination of the components for converting component I into the water-soluble form may be carried out in any sequence. The combination with the neutralizing agent should preferably be carried out in the presence of water. The temperature on combination should be so chosen that the desired water-solubility is achieved but that a significant saponification of the synthetic resins is avoided; the combination is preferably performed at between 20 to 50° C. At the same time amide formation should be largely avoided.

The organic solvents to be optionally conjointly used must be so chosen that they are compatible with the total combination of the components. The total proportion of the solvents used should be as low as possible, especially in the case of EC binders, since particularly in the case of electrophoretic use the solvents have an effect on the electrical film resistance and on the film formation. Isopropyl glycol is an advantageous solvent for EC binders.

When using components I as E binders, an addition of driers which accelerate the curing of the film may be advantageous. Driers which can be dispersed in water and contain Co, Mn, Pb etc., prove advantageous.

In the case of E binders and EC binders, an addition of salts of phosphoric acid or phosphoric acid esters can at times have an advantageous effect on the speed of cure. In the case of EC binders, this additive however requires precise testing since in some cases the film formation can be disturbed. The additive content should however be at most 3% by weight relative to the solids content.

The combination with relatively low molecular, at least hydrophilic, heat-curable condensation products IV, such as reaction products (IVb) which form aminoplasts, and/or phenolic-resols (IVa) and/or etherified phenolic-resols (IVc), results in greater crosslinking of the stoved coating compositions and hence in further improvements in the lacquer coatings such as hardness, gloss, corrosion protection and the like.

By the term heat-curing are also to be understood those condensation products which when heated by themselves reach a state which, although relatively high molecular, is not yet infusible. It is also not absolutely essential for the condensation products themselves to possess water-solubility; it is merely necessary that their hydrophilic character should suffice to give adequate compatibility in combination with the plasticizing component I and the components II and III, i.e, stoved clear lacquer films should be homogeneous, and in aqueous coating compositions no separation of the binder constituents should take place at the processing concentrations.

Heat-curable hydrophilic low molecular condensation products (IVb) which form aminoplasts are aldehyde reaction products of compounds capable of reaction with aldehydes, such as urea, ethyleneurea, dicyandiamide and aminotriazines such as melamine, benzguanimine, acetguanamine and formguanamine. The above-mentioned compounds may be reacted with aldehydes such as formaldehyde, acetaldehyde, crotonaldehyde, acrolein, benzaldehyde, furfurol and the like. Under aldehydes these are also to be understood aldehyde-forming compounds such as paraformaldehyde, paraldehyde and trioxymethylene. The preferred aldehyde is formaldehyde and the preferred aldehyde-forming compounds are melamine and urea. The reaction takes place at the usual molar ratios, for example at a usual formaldehyde molar ratio of 1:1.5 to 1:4 in the case of urea resins, and at a formaldehyde molar ratio of 1:1.5 to 1:6 in the case of melamine resins. The nitrogen-containing polyalcohols are preferably employed in a partially or completely alkylated or alcohol-modified form.

In the present instance the etherification products of the lowest half-ethers of glycol and diglycol, such as ethylglycol and ethyldiglycol, with methylol melamines, such as have already been described in Austrian Pat. 180,407 have also proved successful.

A preferred position is occupied by low molecular condensation products of melamine with formaldehyde having a melamine-formaldehyde ratio of 1:4 to 1:6, which have been practically completely etherified with methanol. Ethers of nitrogen-containing polymethylol compounds which have been partially esterified with dicarboxylic acids, such as are for example obtained by transesterification of hexamethoxymethylmelamine with adipic acid, are also suitable. In heat-hardened lacquers according to the invention, 5 to 50% by weight of these condensation products can be present.

The percentage specified in each case relates to the solids content. Combinations of components I, II, III and IV in which the condensation product forming the aminoplast is present in amounts of 5–25% by weight relative to the solids content are preferred.

Examples of suitable heat-curable hydrophilic low molecular condensation products (IVa) are phenolalcohols and phenolpolyalcohols, that is to say still low molecular products obtained in a known manner in an alkaline medium by condensation of mononuclear and/or polynuclear phenols with aldehydes such as formaldehyde, acetaldehyde, crotonaldehyde, acrolein, benzaldehyde, furfurol and the like or formaldehyde-yielding compounds such as paraformaldehyde, paraldehyde, trioxymethylene, the preferred aldehyde being formaldehyde or a formaldehyde-yielding compound. Suitable phenols are phenol, and phenols which are substituted in the o,o',p-position but can still be condensed with formaldehyde, such as propylphenol and butylphenol, especially p-tert.-butylphenol, are particularly suitable. Furthermore, resols of binuclear phenols, such as diphenol and bisphenol-A are suitable, especially if approximately 1.75 to 2.5 moles of formaldehyde have been added per mole of phenol. When using the resols the conjoint use of a small quantity of a strongly hydrophilic solvent such as ethyl glycol, diethyl glycol, n-propyl glycol, isopropyl glycol and n-butyl glycol is advisable.

The resols of phenolcarboxylic acids, which are obtained by condensation of formaldehyde or formaldehyde-yielding compounds with suitable phenolcarboxylic acids, should be especially emphasized. Among the phenolcarboxylic acids which can be condensed with formaldehyde, 4,4-bis-(4 - hydroxyphenyl)-valeric acid occupies a preferred position. The most advantageous results are here again obtained if 1.75 to 2.5 moles of formaldehyde are bonded per mole of diphenol acid. It is advisable to neutralize the phenolcarboxylic acid resols, preferably with ammonia, before mixing them with the plasticizing component I. The manufacture of further suitable phenolcarboxylic acid resols is for example described in German published patent specification 1,113,775. The phenolcarboxylic acid resols, especially those based on 4,4-bis-(4-hydroxyphenyl)-valeric acid, are outstandingly suitable for the combination according to the invention which are intended to be used according to the invention as coating compositions which can be deposited electrophoretically and as lacquer binders. In the coating compositions and lacquer binders according to the invention, the proportion of hydrophilic phenolic-resols and/or phenolcarboxylic acid resols and/or etherified phenolic-resols and/or etherified phenolcarboxylic acid resols may be 1 to 50% by weight; combinations of which 5 to 25% by weight of the phenolic-resols and/or phenolcarboxylic acid resols are present being preferred.

In a particular embodiment of the coating compositions according to the invention, it was found that it was possible to use, in addition to or in place of the phenolic-resols, etherified phenolic-resols, especially alkyl-phenolic-resols etherified with lower monohydric aliphatic alcohols having 1–4 carbon atoms, such as methanol, ethanol, propanol, or butanol, preferably methanol, as component (IVc). The combination of the epoxide resin partial esters [component I] with etherified phenolic-resols [component IVc] in the coating composition brings with it the advantage of achieving a somewhat higher storage stability of the aqueous coating compositions, and also of yielding an improvement in the corrosion resistance of the stoved films. The phenolic-resols and phenolcarboxylic acid resols, preferably p-tert.-butylphenol-resols, which have already been mentioned, may for example be used as phenolic-resols for the etherification and may be present as the component (IVa) in the coating composition. The degree of etherification and the proportion of etherified phenolic-resols or phenolic-resol carboxylic acids in the coating compositions according to the invention is so regulated as to produce homogeneous films after stoving. The ratios of the epoxide resin partial ester [component I] to the heat-curable condensation products, especially in the case of etherified phenolic-resols [component (IVc)], in the coating compositions according to the invention lie between 1 and 50% by weight and the preferred range is 5–35% by weight, in each case relative to solid resins.

The heat-hardened lacquers can themselves be produced in the usual manner by bringing their components together. In general it is feasible to mix the water-soluble salts of ammonia or amines or mixtures of ammonia and amines and synthetic resins of the component I with the other components in the form of concentrated aqueous solutions which may optionally contain lesser quantities of water-soluble organic solvents and then, if necessary, to adjust the concentration and the pH value of the mixed solutions to the desired values. The pH value of the desired solution should generally be about 7.5–9.0, especially about 8; if necessary, it may be readjusted with ammonia or strong organic nitrogen bases if the resins have been stored for a longer period.

The heat-hardened lacquers may contain the usual additives, for example minor quantities of water-soluble organic solvents in whose presence the components of the lacquer were produced, and/or other solvents such as monoalkyl ethers of diethylene glycol and triethylene glycol, and furthermore compounds of hexavalent chromium such as ammonium dichromate, as well as soluble dyestuffs, pigments, plasticizers, corrosion protection agents, stabilizers and/or curing catalysts.

The heat-hardened lacquers can be applied to the articles to be lacquered by employing the usual methods; they are above all suitable for the lacquering of sheet metal. For this, a particular advantage of the lacquers is that they can also be deposited on the sheet metal by the electrophoresis process. The lacquers can be stoved at temperatures of about 80 to 180°, preferably from about 140 to 180° C., and, depending on the heating temperature, within a period of time of about 10 to 80, preferably about 20 to 60, minutes.

The heat-hardened lacquers according to the invention can be used unpigmented or pigmented and/or containing fillers. They can for example be applied to iron or steel, and non-ferrous metals, with or without pretreatment such as passivation, phosphatization, electrochemical treatment, galvanizing, tin-plating or other metallizing processes.

Pigments and/or fillers are for example—without thereby restricting the invention—red iron oxide, carbon black, lead silico—chromate, strontium chromate, buanc fixe, micronized varieties of baryte, micro-talc, colloidal chalk, diatomaceous earth, china clay, titanium dioxide, green chromium oxide and others. As regards the use of suitable types of titanium dioxide, attention is drawn to F. Holzinger, Deutsche Farbenzeitschrift (German Color Journal), volume 19, page 401, 1965. As regards the selection of color pigments, see the article by E. H. Ott and B. Dreher, Schweizer Archiv für Angewandte Wissenschaft und Technik (Swiss Archives for Applied Science and Technology), volume 31, issue 6, page 189, 1965.

The use of strongly basic pigments such as zinc oxide, zinc chromate, lead carbonate, basic lead sulphate, red lead, and calcium plumbate requires precise testing. These pigments may tend to thicken or to precipitate. The ratio of the pigment to the binder depends on the type of pigment employed and on the envisaged end use. Where the material is used as a stoving lacquer which may be deposited electrophoretically, a pigment to binder ratio of between 0.1 to 1 and 0.8 to 1 is used. A ratio of 0.6 to 1 up to 2 to 1 is usually chosen for the usual processes for employing the coating material, such as spraying, dipping, flooding and the like.

In the most preferred embodiment the vinylized and/or vinylidenized epoxy partial ester is produced from such fatty acid adducts, being described as polybasic carboxylic acids, and the formation of which adducts from $\alpha,\beta$-unsaturated dicarboxylic acid compounds with aliphatic unsaturated straight chain fatty acids having 10 to 40 carbon atoms is carried out in that manner that the content of free $\alpha,\beta$-unsaturated dicarboxylic acid compounds has fallen to below 1% by weight of the quantity employed.

In all cases after completion of the adduct formation the adduct reaction product is hydrolyzed using sufficient water at the temperature of 100° C. for several hours.

The most preferred $\alpha,\beta$-unsaturated dicarboxylic acid is maleic anhydride.

The above mentioned vinylized and/or vinylidenized epoxy resin esters are most suitable for the production of coating compositions to be deposited electrophoretically.

Specific aqueous compositions of the present invention contain:

(A) A reaction product of 15% by weight of vinyl toluene, 5% by weight of acrylic acid, 35% by weight of a hydrolyzed fatty acid adduct of tall oil fatty acid and maleic anhydride of the molar ratio of 1:1 and 45% by less than 1% by weight of maleic acid after hydrolysis, and an epoxy resin partial ester comprising a condensation product of 2,2-bis-(4-hydroxyphenyl)-propane and epichlorhydrin (this epoxy resin has a molecular weight of 950–1050) esterified with 60% by weight of a fatty acid distillate of 65% by weight of linoleic acid, 25% by weight of oleic acid and 10% by weight of saturated fatty acids, mixed with 25% by weight of a phenolic-resol of p-tert.-butylphenol and formaldehyde;

(B) A reaction product of 20% by weight of vinyl toluene, 5% by weight of acrylic acid, 30% by weight of a hydrolyzed fatty acid adduct of tall oil fatty acid and maleic anhydride of the molar raitio of 1:1 and 45% by weight of an epoxy resin partial ester comprising a condensation product of 2,2-bis-(4-hydroxyphenyl)-propane and epichlorhydrin of a molecular weight of 900 esterified with 65% by weight of a fatty acid distillate of 65% by weight of linoleic acid, 25% by weight of oleic acid and 10% by weight of saturated fatty acid, mixed with 25% by weight of an etherified phenol carboxylic acid resol of 4,4-bis(4-hydroxyphenyl)-valeric acid, formaldehyde and methanol;

(C) A reaction product of 28% by weight of vinyl toluene, 7% by weight of acrylic acid, 35% by weight of a hydrolyzed fatty acid adduct of tall oil fatty acid and maleic anhydride (molar ratio 1:1, maleic anhydride content below 1% by weight) and 20% by weight of an epoxy resin partial ester comprising a condensation product of 2,2-bis-(4-hydroxyphenyl)-propane and epichlorhydrin with a molecular weight of 400 esterified with 60% by weight of a fatty acid distillate of 65% by weight of linoleic acid, 25% by weight of oleic acid, 10% by weight of saturated fatty acid, mixed with 20% by weight of a phenol carboxylic acid resol of 4,4-bis-(4-hydroxyphenyl)-valeric acid and formaldehyde;

(D) A reaction product of 15% by weight of styrene, 5% by weight of α-methyl styrene, 5% by weight of acrylic acid, 40% by weight of a hydrolyzed fatty acid adduct of tall oil fatty acid and maleic anhydride, the product is showing less than 1% by weight of maleic anhydride after hydrolysis, and 35% by weight of an epoxy resin partial ester comprising a condensation product of 2,2-bis-(4-hydroxyphenyl)-propane and epichlorhydrin with a molecular weight of 1000 esterified with 50% by weight of a fatty acid distillate of 50% by weight of linoleic acid, 35% by weight of oleic acid and 15% by weight of saturated fatty acids, mixed with 25% by weight of a phenolic-resol of p-tert.-butylphenol and formaldehyde;

(E) A reaction product of 20% by weight of vinyl toluene, 5% by weight of acrylic acid, 30% by weight of a hydrolyzed fatty acid adduct of tall oil fatty acid and maleic anhydride, the product showing less than 1% by weight of maleic anhydride after hydrolysis, and 45% by weight of an epoxy resin partial ester comprising a condensation product of 2,2-bis-(4-hydroxyphenyl)-propane and epichlorhydrin with a molecular weight of 900 esterified with 65% by weight of a fatty acid distillate of 65% by weight of linoleic acid, 25% by weight of oleic acid and 10% by weight of saturated fatty acid, mixed with 20% by weight of an aminoplast of melamine, formaldehyde and methanol;

(F) A reaction product of 15% by weight of styrene, 5% by weight of α-methyl styrene, 5% by weight of acrylic acid and 40% by weight of a hydrolyzed fatty acid adduct of tall oil fatty acid and maleic anhydride and 35% by weight of an epoxy resin partial ester comprising a condensation product of 2,2-bis-(4-hydroxyphenol)-propane and epichlorhydrin with a molecular weight of 1000 esterified with 50% by weight of a fatty acid distillate of 50% by weight of linoleic acid, 35% by weight of oleic acid and 15% saturated fatty acids, mixed with 20% by weight of an aminoplast of melamine, formaldehyde and methanol;

(G) A reaction product of 15% by weight of styrene, 5% by weight of α-methyl styrene, 5% by weight of acrylic acid, 40% by weight of a hydrolyzed fatty acid adduct of dehydrated castor oil fatty acid and maleic anhydride, the product showing less than 1% by weight of maleic anhydride after hydrolysis, and 35% by weight of an epoxy resin partial ester comprising a condensation product of 2,2-bis-(4-hydroxyphenyl)-propane and epichlorhydrin with a molecular weight of 1600 esterified with 10% by weight of a fatty acid distillate of 45% by weight of linoleic acid, 35% by weight of oleic acid and 10% by weight of saturated fatty acids, mixed with 20% by weight of a phenolic-resol of p-tert.-butylphenol and formaldehyde;

(H) A reaction product of 15% by weight of styrene, 5% by weight of α-methyl styrene, 5% by weight of acrylic acid, 40% by weight of a hydrolyzed fatty acid a;dduct of soya oil fatty acid and maleic anhydride, the product showing less than 1% by weight of maleic anhydride after hydrolysis, and 45% by weight of an epoxy resin partial ester comprising a condensation product of 2,2-bis-(4-hydroxyphenyl) - propane with a molecular weight of 1000 and epichlorhydrin esterified with 50% by weight of a fatty acid distillate of 45% by weight of linoleic acid, 35% by weight of oleic acid and 10% by weight of saturated fatty acids, mixed with 25% by weight of a phenolic-resol of p-tert.-butylphenol and formaldehyde;

(I) A reaction product of 15% by weight of styrene, 5% by weight of α-methyl styrene, 5% by weight of acrylic acid, 40% by weight of a hydrolyzed fatty acid adduct of safflower oil fatty acid and maleic anhydride, the product showing less than 1% by weight of maleic anhydride after hydrolysis, and 35% by weight of an epoxy resin partial ester comprising a condensation product of 2,2-bis-(4-hydroxyphenyl)-propane and epichlorhydrin with a molecular weight of 1000 esterified with 60% by weight of a fatty acid distillate of 45% by weight of linoleic acid, 35% by weight of oleic acid and 10% by weight of saturated fatty acids, mixed with 20% by weight of a phenolic-resol of p-tert.-butylphenol and formaldehyde;

(J) A reaction product of 20% by weight of n-butyl acrylate, 5% by weight of acrylic acid, 40% by weight of a hydrolyzed fatty acid adduct of tall oil fatty acid and maleic anhydride, the product showing less than 1% by weight of maleic anhydride after hydrolysis, and 35% by weight of an epoxy resin partial ester comprising a condensation product of 2,2-bis-(4-hydroxyphenyl)-propane and epichlorhydrin with a molecular weight of 900–1100, esterified with 50% by weight of a fatty acid distillate of 60% by weight of linoleic acid, 30% by weight of oleic acid and 10% by weight of saturated fatty acid, mixed with 20% by weight of an aminoplast of melamine, formaldehyde and methanol; and (K) A reaction product of 15% by weight of 2-ethylhexylacrylate, 5% by weight of acrylic acid, 35% by weight of a hydrolyzed fatty acid adduct of tall oil fatty acid and maleic anhydride, the product showing less than 1% by weight of maleic anhydride after hydrolysis, and 45% by weight of an epoxy resin partial ester comprising a condensation product of 2,2-bis-(4-hydroxyphenyl)-propane and epichlorhydrin with a molecular weight of 1100 esterified with 60% by weight of a fatty acid distillate of 60% by weight of linoleic acid, 35% by weight of oleic acid and 5% by weight of saturated fatty acid, mixed with 25% by weight of an aminoplast of melamine, formaldehyde and methanol.

Manufacture of the epoxide resin partial ester 1

(Unless otherwise stated, parts are always to be understood as parts by weight. The viscosity was determined according to Gardner-Holdt.)

800 parts of an epoxide resin with an epoxide equivalent weight of approximately 250, a melting point of 20 to 28° C. and a molecular weight of approximately 470, which had been obtained by condensation of 2,2-bis-(4-hydroxyphenyl)-propane and epichlorhydrin in the presence of strong alkalis, are esterified with 800 parts of a fatty acid distillate which consists of approximately 60 to 70% by weight linoleic acid, approximately 5% by weight saturated fatty acids and approximately 25 to 35% by weight oleic acid, at 220 to 230° C. under an inert gas until the acid number has fallen to below 1. The viscosity, measured at 66% strength by weight in butyl glycol, lies in the range of F to K.

Manufacture of the fatty acid adduct A 300 parts dehydrated castor oil fatty acids and 450 parts of tall oil fatty acids containing not more than 1.5% by weight of resin and less than 1% by weight of non-saponifiable matter are reacted with 250 parts maleic anhydride at 180 to 200° C. in a known manner until the content of free maleic anhydride has fallen to below 1% by weight of the quantity employed. After completion of adduct formation, the mixture is cooled to 80° C. and the anhydride is hydrolyzed with 45 parts of water by keeping at 100° C. for 2 hours.

Manufacture of component I, instruction 1

750 parts epoxide resin partial ester 1, 75 parts vinyltoluene, 9 parts acrylic acid, 3 parts di-tert.-butyl peroxide and 1.5 parts lauryl mercaptan are reacted at 150° C. in a stainless steel reaction vessel provided with a condenser, stirrer and thermometer, until the solids content has risen to about 98 to 99% by weight. The copolymerization may optionally be accelerated by replenishing with small quantities of catalyst. When the solids content has been reached, volatile constituents still remaining are distilled off by applying a vacuum. The viscosity of the resin, measured at 66% strength by weight in n-butyl glycol, falls within the range M to Q. After distilling off, 360 parts of fatty acid adduct A are added and the reaction is continued at 140 to 160° C. until the viscosity of the resin, at 50% strength by weight in n-butyl glycol, has reached F to H. The reaction is appropriately carried out in vacuum and excess water is distilled off. The resin is neutralized with water and ammonia solution until a sample of the resin, at 20% strength by weight is water, exhibits a pH value of 8. The resin is adjusted to a solids content of 75% by weight with water.

Manufacture of component I, instruction 2

The procedure of instruction 1 is followed, but dimethylethanolamine is used for the neutralization.

Epoxide resin partial ester 2

700 parts of an epoxide resin having an epoxide equivalent weight of approximately 190, a refractive index at 20° C. of 1.5720, and a molecular weight of approximately 380, which was obtained by condensation of bisphenol-A and epichlorhydrin in the presence of alkalis, are esterified at 220 to 230° C., under an inert gas, with 945 parts of a fatty acid mixture consisting of about 65 to 70% by weight linoleic acid, 5% by weight saturated fatty acids and 25 to 30% by weight oleic acid in the presence of 0.5 parts of anhydrous soda until the acid number has fallen to below 1. The viscosity, at 66% strength by weight in n-butyl glycol, is B to D (Gardner-Holdt viscometer).

Manufacture of component I, instruction 3

1000 parts of the epoxide resin partial ester 2 are mixed over the course of 2 to 3 hours, in a flask having a stirrer, condenser and thermometer, with a mixture of 210 parts styrene, 570 parts α-methylstyrene, 70 parts acrylic acid and 28 parts di-tert.-butyl peroxide, with the reaction temperature being kept at 150° C. The batch is further kept at this temperature until the solids content has risen to approximately 83% by weight. The excess monomer is then distilled off in vacuum. The acid number should be 25 to 35 and the viscosity should be in the range of S to Z, measured at 66% strength by weight in n-butyl glycol. After the end of the distillation the vacuum is replaced by an inert gas and after adding 410 parts of fatty acid adduct A the resin is reacted at 140 to 150° C. until the viscosity, measured at 50% strength by weight in n-butyl glycol, lies in the range E to G. The resin is diluted to approximately 80% by weight solids content with ethyl glycol and is neutralized with aqueous ammonia solution at below 40° C. until the resin can be infinitely diluted with water.

Manufacture of the fatty acid adduct B

The method is the same as the production of the fatty acid adduct A, however, the dehydrated castor oil fatty acid and the tall oil fatty acid is replaced by soybean oil fatty acid.

Epoxide resin partial ester 3

800 parts of an epoxide resin with an epoxide equivalent weight of approximately 250, a melting point of 20–28° C. and a molecular weight of approximately 470 which had been obtained by condensation of 2,2-bis-(4-hydroxyphenyl)-propane and epichlorhydrin in the presence of strong alkalis are esterified with 800 parts of 9,11 linoleic acid at 220–230° C. under an inert gas until the acid number has fallen below 1. The viscosity measured at 66% strength by weight in n-butyl glycol lies in the range of G–I.

Manufacture of component I, instruction 4

750 parts epoxide resin partial ester 3, 75 parts vinyltoluene, 9 parts acrylic acid, 3 parts di-tert.-butyl peroxide, 1.5 parts lauryl mercaptan are reacted in a reaction vessel of stainless steel which has a cooler, agitator and thermometer at a temperature of 150° C. until the solids content has reached 98–99% by weight. When the solids content is received the remaining volatile parts are distilled off by use of vacuum. Then 360 parts of the fatty acid adduct B are added and the mixing is continued until the viscosity of the resin (50% by weight measured in n-butyl glycol) is F–H. The resin is neutralized with water and diisopropanolamine until a test sample of the resin 20% by weight in water shows a pH value of 8. The resin is adjusted to a solids content of 75% by weight with water.

Epoxide resin partial ester 4

The same method is adopted as for the manufacture of the epoxide resin partial ester 3. However, instead of 9,11 linoleic acid 9,12 linoleic acid is used. The viscosity of the product is by I–K 66% by weight measured in n-butyl glycol.

Manufacture of component I, instruction 5

The same method is adopted as for the manufacture of the component I, instruction 4. However, the epoxide resin partial ester 4 is used. The resin is adjusted to a solids content of 75% by weight with water.

Manufacture of component I, instruction 6

The method is carried out as in instruction 1, however, 75 parts of vinyltoluol are replaced by 75 parts of n-butylacrylate.

Manufacture of component I, instruction 7

The method is carried out as in instruction 1, however, 75 parts of vinyltoluol are replaced by 75 parts of 2-ethylhexylacrylate.

The invention is explained by the following examples, without limiting the invention thereto.

Examples of component (Va), heat-curable hydrophilic aldehyde condensation products Manufacture of phenolic-resol 1.—50 parts of p-tert.-butylphenol and 80 parts of aqueous formaldehyde solution (30% strength by weight) are allowed to react with one another at about 40° C. under the influence of strong caustic alkalis, until the content of free formaldehyde has fallen to practically nil. The resol is decomposed with the aid of strong acids and is washed with water until free of salt.

Manufacture of the phenolcarboxylic acid resol 2.— 350 parts of 4,4-bis-(4-hydroxyphenyl)-valeric acid and 270 parts of aqueous formaldehyde solution (30% strength by weight) are reacted at about 40° C. under the influence of strong caustic alkalis until about 1.8 to 2 moles formaldehyde have been bonded per mole of diphenol-acid. The product is decomposed by means of strong acids and the resol is washed with water until free of salt. The washed phenolic-resol is neutralized with aqueous 20% strength by weight solution is about 8.

Manufacture of phenolcarboxylic acid resol 3.—228 g. diphenylolpropane, 1 mole sodium hydroxide solution and ½ liter water are mixed and the phenolate solution is reacted at approximately 80–90° C. with a solution of 110 g. sodium chloracetate in 170 g. water. The part of an average sample, freed of alkali by acidification, which is soluble in a mixture of toluene and n-butanol indicates, from the acid number that about 85% by weight of the bisphenol have been reacted while the rest remained free.

After separation from the mobile salt-containing aqueous layer the mass is reacted with 200 g. formaldehyde (35% strength by weight) at a moderately elevated temperature in a known manner under the influence of strong caustic alkalis. The phenol-carboxylic acid resol is decomposed by strong acids, washed with water until free of salt and neutralized with aqueous ammonia solution.

Example of the manufacture of a component (IVb) of the condensation product 4 which forms an aminoplast 126 parts of melamine are reacted in a known manner with 480 parts of 44% strength by weight aqueous formaldehyde solution in a weakly alkaline buffered solution (pH value approximately 8) at approximately 60° C. The resulting reaction product—essentially hexamethylolmelamine—is subsequently etherified in a known manner with an excess of methanol in hydrochloric acid solution at approximately 40–50° C. The etherification product is neutralized with sodium hydroxide solution, the salts are separated off and the material freed from water and excess methanol by vacuum distillation. The resulting product has a very low free formaldehyde content.

Manufacture of the etherified phenolic resol 5 as component (XVc)

500 parts of p-tert.-butylphenol-resol 1, as already described, are mixed with a quantity of methanol such that the water content of the reaction mixture, relative to methanol, is not more than 20% by weight. The mixutre is then adjusted to a pH value of approximately 2–1 with sulfuric acid and warmed to 60° C. for about 2–3 hours. The solids content of a neutralized sample rises by about 2–3% by weight. The batch is then neutralized with sodium hydroxide solution and the methanol and water are distilled off in vacuum, during which a temperature of 60° C. should not be exceeded. The reaction mixture is twice washed with distilled water in order to remove the salts. The solids content is adjusted to 60% by weight by adding water.

Manufacture of the etherified phenolcarboxylic acid resol 6 as component (IVc)

700 parts of 4,4-bis(4-hydroxyphenyl)-valeric acid and 1000 parts of 30% strength by weight aqueous formaldehyde solution are mixed with 300 parts of aqueous sodium hydroxide solution (40% strength by weight). The batch is kept at 40° C. until 3.3–3.6 moles formaldehyde have been bonded per mole 4,4-bis-(4-hydroxyphenyl)-valeric acid. 635 parts of hydrochloric acid prepared by diluting concentrated hydrochloric acid with water in a ratio of 1:1 are then added, until the aqueous solution of the resol has reached a pH value of 3–4. The precipitated resol is washed once in 200 parts of water. The resol has a solids content of 79% by weight. 500 parts of this resol are dissolved in 700 parts of methanol and the solution is adjusted to a pH value of 2–1 with approximately 22 parts of concentrated hydrochloric acid. The batch is kept at 40–45° C. until the water compatibility has fallen to 1:0.8 to 1:0.7. The water compatibility is determined at 20° C. by adding water to 10 g. of the solution until the mixture begins to turn cloudy. A water compatibility of 1:0.8 means that 8 g. of water are required for 10 g. of material in order to reach cloudiness. After the water compatibility has been reached the mixture is neutralized with 20% strength by weight sodium hydroxide solution to a pH value of 7–8 and the excess methanol is distilled off in vacuum at 45° C. The mixture is adjusted to a pH value of about 3 with hydrochloric acid at room temperature and the resin is washed with water until free of salt. The solids content of the resin is about 70% by weight.

EXAMPLE 1

800 parts of component I according to instruction 1 are mixed with 250 parts of phenolic-resol 1 and diluted to the processing concentration with water, optionally with the addition of solvent. The readjustment of the pH value may be necessary. Depending on the field of application, the material may be ground with neutral pigments for example titanium dioxide, red iron oxide, carbon black, etc.

The use of basic pigments such as zinc oxide requires careful testing since there is a danger of a viscosity increase. The coating composition can be used for application as a very good corrosion-resistive primer by means of spraying or dipping.

EXAMPLE 2

300 parts of epoxide resin partial ester component I according to instruction 1 are mixed with 76 parts of etherified phenolcarboxylic acid resol 6 and the mixture is adjusted to about 80% by weight solids content with ethyl glycol. The mixture is again neutralized by adding ammonia solution in the presence of water until the pH value of a 20% strength by weight solution is 7.8–8.4. An analysis of the film which was electrophoretically deposited from an aqueous 10% strength by weight bath of the binder according to Example 2 shows that the phenolicresol content in the film corresponds to that of the bath. This binder is thus exceptionally suitable for electrophoretic application.

The electrophoretically applied coatings show great hardness after the stoving, good adhesion and very good resistance against salt spray solutions.

EXAMPLE 3

800 parts of the epoxide resin partial ester component I according to instruction 2 are diluted with 160 parts of ethyl glycol and 800 parts of water. 360 parts of the phenolcarboxylic acid resol 2 (solids content 56% by weight) are mixed with this solution.

The obtained binding composition is suitable for electrophoretic lacquerings and gives primers of very good corrosion resistivity and adhesion after being stoved.

EXAMPLE 4

1000 parts of the epoxide resin partial ester component I according to instruction 3 (60% strength by weight) are diluted with 400 parts of water until the pH value of a 20% strength by weight aqueous solution is 8–9. Thereafter 220 parts of the phenolic-resol 1 (solids content 64% by weight) are added. The coating composition can be applied by spraying and dipping and gives primers of great hardness and corrosion resistivity after being stoved.

EXAMPLE 5

800 parts of the epoxide resin partial ester component I according to instruction 1 are diluted with 160 parts of n-butyl glycol and 800 parts of water and are mixed with 150 parts of the condensation product 4 which forms an aminoplast.

The coating composition can be applied by spraying and dipping and gives relatively light-coloured coatings having good elasticity and very good salt spray resistance already after being stored at 150° C. for 30 minutes.

EXAMPLE 6

1000 parts of the epoxide resin partial ester component I according to instruction 3 (60% strength by weight) are diluted with 400 parts of water and mixed with 200 parts of the condensation product 4 which forms an aminoplast.

The binder is suitable for electrophoretic lacquerings and gives coatings of good corrosion resistance and good elasticity and which are relatively light-coloured after being stoved. This coating composition can therefore also be used as one-coat-system.

EXAMPLE 7

800 parts of component I according to instruction 4 are mixed with 250 parts of phenolic resol 1 and thinned down with water or possibly under adding a solvent to manufacturing concentration. According to the scope of use of a grinding with neutral pigments such as titandioxide, iron red, soot black is possible.

This coating composition can be applied by spraying or dipping and gives primers after stoving of great hardness and good salt spray resistance.

EXAMPLE 8

The method of Example 7 is adopted, however, component I according to instruction 4 is used.

The binder can be applied by spraying or dipping and gives coatings of gread hardness and good salt spray resistance already after a stoving time of 30 minutes at 150° C.

EXAMPLE 9

The method is the same as in Example 1, however, 800 g. of component I according to instruction 6 are used.

This coating composition can be applied electrophoretically and gives primers of good corrosion resistance after stoving.

EXAMPLE 10

The method is the same as in Example 1, however, 800 g. of component I according to instruction 7 are used.

EXAMPLE 11

500 parts of component I according to instruction 8 are mixed with component IVb (=aminoplast-forming condensation product 4). The pH value is adjusted to 8 using diisopropanolamine and the resin is diluted to a solids content of 70% by weight using n-butyl glycol.

EXAMPLE 12

800 parts of component I according to instruction 3 are mixed with 300 parts of component Va (=phenol-carboxylic acid resol 2) and with 100 parts of component IVb (=aminoplast-forming condensation product 4). The pH value is adjusted to 8.5 by adding aqueous ammonia and the resin mixture is diluted to a solids content of 70% by weight using ethyl glycol.

The aqueous coating compositions according to Examples 1–12, either unpigmented or pigmented or provided with other suitable fillers, yield very stable coatings after stoving at about 140–220° C. for 30–20 minutes.

A bath solution suitable for electrophoretic lacquering is for example manufactured as follows:

10 kg. of a 40% strength by weight solution of the resin combinations according to Example 2 are ground with 2 kg. red iron oxide in a ball mill and diluted to a solids content of about 20–10% by weight with distilled water. For electrophoretic lacquering the metallic article is dipped into the bath to serve as the anode. On applying a D.C. potential of about 100 volts the article is uniformly coated with the coating composition according to the invention. The deposited coating thickness can be increased by adding limited quantities of suitable organic solvents which are miscible with water, for example ethyl glycol or n-butyl glycol. A highly corrosion-resistant coating is obtained by stoving at 170–190° C. (30–20 minutes).

The preceding examples can be repeated with similar success by substituting generically and specifically described reactants and operating conditions of this invention for those used in the preceding examples.

From the foregoing description, one skilled in the art can easily ascertain the essential characteristics of this invention and without departing from the spirit and scope thereof, can make various changes and modifications of the invention to adapt it to various usages and conditions. Consequently, such changes and modifications are properly, equitably and intended to be, within the full range of equivalence of the following claims.

What I claim is:

1. A water-dilutable epoxy resin ester coating composition comprising:

(a) partial esters of compounds containing epoxy groups or hydroxyl groups formed by hydrolytic dissociation of said epoxy groups with monocarboxylic acid mixtures which consist of at least 60 percent by weight of aliphatic unsaturated straight chain fatty acids having 10 to 40 carbon atoms, said compounds containing epoxy groups consisting of epoxy resins of the general formula

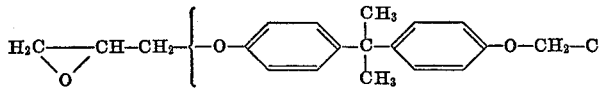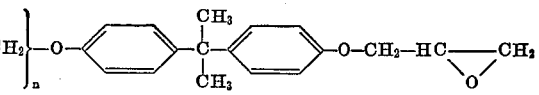

wherein $n$ represents molecular weights of between about 380 and 3500;

(b) said partial esters of (a) reacted with polybasic carboxylic acids whereby the resulting epoxy ester resins have free carboxyl groups and free hydroxyl groups rendered water-dilutable by neutralization with aqueous ammonia or strong organic nitrogen bases in the presence of water;

(c) sufficient basic material selected from the group consisting of aqueous ammonia and strong organic nitrogen bases having a pH equal to or greater than 10.0 in 0.05 normal aqueous solution, said basic material in the presence of water whereby the esters are converted into water-dilutable synthetic resins;

(d) hydrophilic to water-soluble, low molecular weight aldehyde condensation products selected from the group consisting of phenolic - resols, etherified phenol resols, phenol-resol-carboxylic acids, etherified phenol-resol-carboxylic acid resols, urea aldehyde aminoplasts, ethyleneurea-aldehyde aminoplasts, dicyandiamidealdehyde aminoplasts and aminotriazine-aldehyde aminoplasts; the improvement comprising: vinylized and/or vinylidenzied epoxy resin esters produced by heating in the presence of an organic peroxide polymerization catalyst in the temperature range of between 120 and 180° C., a compound selected from the group consisting of $\alpha,\beta$-vinyl and $\alpha,\beta$-vinylidene compounds with the compounds selected from the group consisting of said partial esters of step (a), the reaction products of step (b), said aliphatic unsaturated straight chain fatty acids used in step (a), and said polybasic carboxylic acids selected from the group consisting of oxalic acid, succinic acid, glutaric acid, adipic acid, pimelic acid, 2,2,4-trimethyl-adipic acid, suberic acid, azelaic acid, sebacic acid, maleic acid, fumaric acid, citraconic acid, mesaconic acid, itaconic acid, phthalic acid, isophthalic acid, terephthalic acid, tetrahydro- and hexahydrophthalic acid, trimellitic acid and hydrolyzed adducts of $\alpha,\beta$-unsaturated dicarboxylic acid compounds selected from the group consisting of maleic acid, fumaric acid, mesaconic acid, citraconic acid, itaconic acid and maleic anhydride with aliphatic unsaturated straight chain fatty acids having 10 to 40 carbon atoms, used in step (b); wherein the products of said vinylation and/or vinylidenation are vinyl and/or vinylidene modified epoxy resin esters having free carboxyl groups, free hydroxyl groups and acid numbers between about 35 and 300, and the ratio of the number of free hydroxyl groups to the number of free carboxyl groups is between about 0.2:1 and 2:1.

2. The composition of claim 1, wherein said polybasic carboxylic acids of (b) are hydrolyzed adducts of α,β-unsaturated dicarboxylic acid compounds selected from the group consisting of maleic acid, fumaric acid, mesaconic acid, citraconic acid, itaconic acid and maleic anhydride with aliphatic unsaturated straight chain fatty acids having 10 to 40 carbon atoms.

3. The composition of claim 1, wherein said polybasic carboxylic acids of (b) are hydrolyzed adducts of maleic anhydride with aliphatic unsaturated straight chain fatty acids having 10 to 40 carbon atoms, the adduct formation of which is carried out until the content of free maleic anhydride has fallen to below 1% by weight of the quantity employed.

4. The composition of claim 1, wherein the acid numbers of the vinylized and/or vinylidenized epoxy esters are between about 50 and 120.

5. The composition of claim 1, wherein the ratio of the number of said hydroxyl groups to the number of said carboxyl groups of the vinylized and/or vinylidenized epoxy esters is about 0.3:1 to 1.3:1.

6. The composition of claim 1, wherein said aldehyde condensation products are present in a concentration of about 1 to 50 percent by weight.

7. The composition of claim 1, wherein said epoxy resin esters are the reaction products of compounds containing epoxide groups and optionally hydroxyl groups with compounds selected from the group consisting of unsaturated aliphatic straight chain monocarboxylic fatty acids, monocarboxylic acid mixtures having a predominant content of unsaturated aliphatic straight chain monocarboxylic acid and mixtures of monocarboxylic acid having a predominant content of unsaturated aliphatic straight chain monocarboxylic acid and polybasic carboxylic acids.

8. A process for producing water dilutable epoxy resin ester coating compositions comprising:
(a) forming partial esters of compounds containing epoxy groups or hydroxyl groups formed by hydrolytic dissociation of said epoxy groups with monocarboxylic acid mixtures which consist of at least 60 percent by weight of aliphatic unsaturated straight chain fatty acids having 10 to 40 carbon atoms, said compounds containing epoxy groups consisting of epoxy resins of the general formula

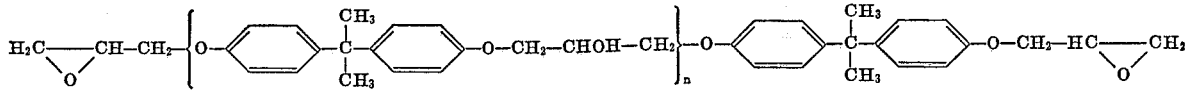

wherein n represents molecular weights of between about 380 and 3500;
(b) reacting said partial esters with polybasic carboxylic acids whereby the resulting epoxy ester resins have free carboxyl groups and free hydroxyl groups rendered water-dilutable by neutralization with aqueous ammonia or strong organic nitrogen bases in the presence of water;
(c) reacting the material produced in step (b) with sufficient basic material selected from the group consisting of aqueous ammonia and strong organic nitrogen bases having a pH equal to or greater than 10.0 in 0.05 normal aqueous solution, said basic material in the presence of water until the esters are converted into water-dilutable synthetic resins; and
(d) adding hydrophilic to water-soluble, low molecular weight aldehyde condensation products selected from the group consisting of phenolic-resols, etherified phenolic-resols, phenol-resol-carboxylic acids, etherified phenol-resol-carboxylic acid resols, urea-aldehyde aminoplasts, ethylene-urea-aldehyde aminoplasts, dicyandiamide-aldehyde aminoplasts and aminotriazine-aldehyde aminoplasts; the improvement comprising: reacting by heating in the presence of polymerization catalysts a compound selected from the group consisting of α,β-vinyl and α,β-vinylidene compounds with the compounds selected from the group consisting of said partial esters of step (a), the reaction products of step (b), said aliphatic unsaturated straight chain fatty acids used in step (a), said polybasic carboxylic acids used in step (b), and mixtures thereof; wherein the products of said reaction are vinyl and/or vinylidene modified epoxy resin esters having free carboxyl groups, free hydroxyl groups and acid numbers between about 35 and 300, and the ratio of the number of free hydroxyl groups to the number of free carboxyl groups is between about 0.2:1 and 2:1.

9. The process of claim 8, wherein said polybasic carboxylic acids of (b) are hydrolyzed adducts of α,β-unsaturated dicarboxylic acid compounds selected from the group consisting of maleic acid, fumaric acid, mesaconic acid, citraconic acid, itaconic acid and maleic anhydride with aliphatic unsaturated straight chain fatty acids having 10 to 40 carbon atoms.

10. The process of claim 8, wherein said polybasic carboxylic acids of (b) are hydrolyzed adducts of maleic anhydride with aliphatic unsaturated straight chain fatty acids having 10 to 40 carbon atoms, the adduct formation of which is carried out until the content of free maleic anhydride has fallen to below 1% by weight of the quantity employed.

11. The process of claim 8, wherein said polybasic carboxylic acids of (b) are selected from the group consisting of oxalic acid, succinic acid, glutaric acid, adipic acid, pimelic acid, 2,2,4-trimethyl-adipic acid, suberic acid, azelaic acid, sebacic acid, maleic acid, fumaric acid, citraconic acid, mesaconic acid, itaconic acid, phthalic acid, isophthalic acid, terephthalic acid, tetrahydro- and hexahydrophthalic acid and trimellitic acid.

References Cited
UNITED STATES PATENTS

| | | | |
|---|---|---|---|
| 3,563,929 | 2/1971 | Guldenpfennig | 260—23 |
| 3,567,668 | 3/1971 | Guldenpfennig | 260—19 |
| 3,536,641 | 10/1970 | Sekmakas et al. | 260—22 |
| 3,575,909 | 4/1971 | Gilchrist | 260—29.3 |
| 3,118,848 | 1/1964 | Lombardi et al. | 260—29.3 |
| 2,981,710 | 4/1961 | Hoenel | 260—29.3 |
| 3,284,280 | 11/1966 | Armour et al. | 260—29.3 |
| 3,432,453 | 3/1969 | Sarnia et al. | 260—29.3 |

DONALD E. CZAJA, Primary Examiner

E. C. RZUCIDLO, Assistant Examiner

U.S. Cl. X.R.

204—181; 260—23 EP, 29.3